United States Patent [19]

Voegele et al.

[11] 4,273,263
[45] Jun. 16, 1981

[54] FILLING APPARATUS FOR FLUID MEDIA

[75] Inventors: Günther Voegele, Schönaich; Günter Meyer, Brettheim, both of Fed. Rep. of Germany

[73] Assignee: Robert Bosch GmbH, Stuttgart, Fed. Rep. of Germany

[21] Appl. No.: 37,601

[22] Filed: May 10, 1979

[30] Foreign Application Priority Data

May 13, 1978 [DE] Fed. Rep. of Germany ....... 2821052

[51] Int. Cl.³ .......................... B65B 3/32; F04B 21/08; B08B 3/04
[52] U.S. Cl. .................................. 222/148; 222/152; 222/372; 141/91; 417/431
[58] Field of Search ............... 222/372, 381, 309, 148, 222/152; 417/431, 519; 92/86.5; 239/112; 141/90, 91

[56] References Cited

U.S. PATENT DOCUMENTS 1,930,944  10/1933  Schmitz .......................... 222/372 X
1,933,367  3/1935   Geyer ............................. 222/372 X
3,146,940  9/1964   McGrory et al. ................ 92/86.5 X
3,684,409  8/1972   Sanz et al. ...................... 417/519
3,693,640  9/1972   Wettlen et al. ................. 222/148 X
3,874,825  4/1975   Jentsch ........................... 417/519

FOREIGN PATENT DOCUMENTS 2308689  9/1974  Fed. Rep. of Germany ........... 222/148

Primary Examiner—Robert J. Spar
Assistant Examiner—Frederick R. Handren
Attorney, Agent, or Firm—Edwin E. Greigg

[57] ABSTRACT

A dispensing apparatus for fluid media is disclosed which comprises a dosing piston movably guided within a dosing cylinder and a subsequent rotary valve, wherein the cleaning and/or sterilization of the parts coming into contact with the filling product can be performed without removing these parts. By means of a particular disposition and embodiment of the dosing piston, the rotary valve and the dosing cylinder, it is possible to make the dosing piston and rotary valve accessible rapidly and simply.

5 Claims, 2 Drawing Figures

FILLING APPARATUS FOR FLUID MEDIA

BACKGROUND OF THE INVENTION

In a known filling apparatus for fluid media (German Offenlegungsschrift No. 23 08 689), there is disclosed a dosing piston which is movable into an extended portion of the dosing cylinder where the outer surface of said piston is exposed. In this extended portion of the cylinder, the dosing piston becomes accessible for cleansing through a rinsing or cleaning medium. The rotary valve provided at the upper part of the dosing cylinder, however, cannot be made accessible in this known apparatus; thus it can neither be completely cleaned, nor, more importantly, can it be sterilized. For applications within the pharmaceutical industry in particular, such a filling apparatus, which cannot be rendered sterile, cannot be used. To meet this requirement for sterility, therefore, an apparatus is needed in which both the dosing piston and the rotary valve are fully accessible for cleansing via an enveloping fluid comprising a rinsing, cleaning, and/or sterilizing medium.

OBJECT AND SUMMARY OF THE INVENTION

It is the principal object of the invention disclosed herein to provide an apparatus which has the advantage over the prior art, that as a result of the particular coaxial disposition of dosing piston and rotary valve, both the dosing piston and the rotary valve can be made fully accessible to a cleansing medium by means of a simple displacement of the dosing cylinder. This arrangement allows a very simple and certain cleaning or sterilization of the piston and valve which come into contact with the dispensed end product.

Another object of the invention is to obviate the need for an additional pump clamping means, in the apparatus according to the invention, by providing a dosing cylinder which is guided, in movement up and down, within a cylinder which is secured, preferably to the machine frame.

A further object of the invention is to provide an apparatus which, in the disassembled state as well, offers the capability for cleaning due to the fact that the cylinder bore extends entirely through the cylinder.

A still further object is that, advantageously, this dispensing apparatus can also be used for end products which crystallize out, without additional liquid, so that there is no danger of intermixing.

The characteristics recited in the dependent claims provide advantageous further embodiments and improvements of the dispenser arrangement recited in the main claim.

The invention will be better understood, as well as further objects and advantages thereof become more apparent, from the ensuing detailed description of a preferred embodiment taken in conjunction with the drawing.

DESCRIPTION OF THE PREFERRED EMBODIMENT

Figure 1:
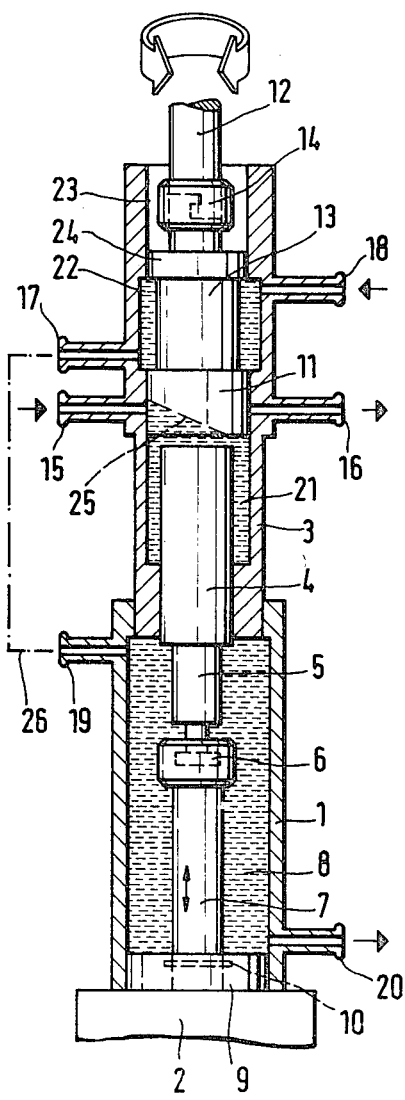
FIG. 1 shows a dispensing apparatus following the invention in working position, that is, in the fluid induction phase.

Referring now to FIG. 1, there is shown a dispenser apparatus in accordance with the invention which comprises a cylinder 1, which is positively mounted, for example, upon a machine frame 2, and a dosing cylinder 3 guided for movement upwardly and downwardly within this cylinder 1 by known means (not shown). Within this dosing cylinder 3, a dosing piston 4 is provided which is connected, via a piston rod 5 and a coupler 6, with a rod 7, which rod is also movable up and down by other known means (not shown). In order to seal the chamber 8 from contamination by outside air, the chamber is filled with protective gas during the dispensing operation, which gas is retained by a seal 10 in the base 9 of the cylinder 1.

A rotary valve 11 is disposed above the dosing piston 4 within the dosing cylinder 3. This rotary valve 11 is connected to an actuation shaft 12 via an attachment 13 and a coupler 14. The actuation shaft 12 is made to rotate during operation by known means, which are not shown. The dosing cylinder 3 is provided with an inlet channel 15 and an outlet channel 16, respectively, for supply and delivery of the product to be dispensed. Inlet channel 15 and outlet channel 16 are provided in opposed relation to one another. In opposed spaced relation, inlet and outlet channels 17 and 18, respectively, are provided for admitting and discharging both protective gas and the cleansing or sterilization fluid; to achieve the same purpose, the cylinder 1 is provided in opposed spaced relation with inlet and outlet channels 19 and 20, respectively.

Figure 2:
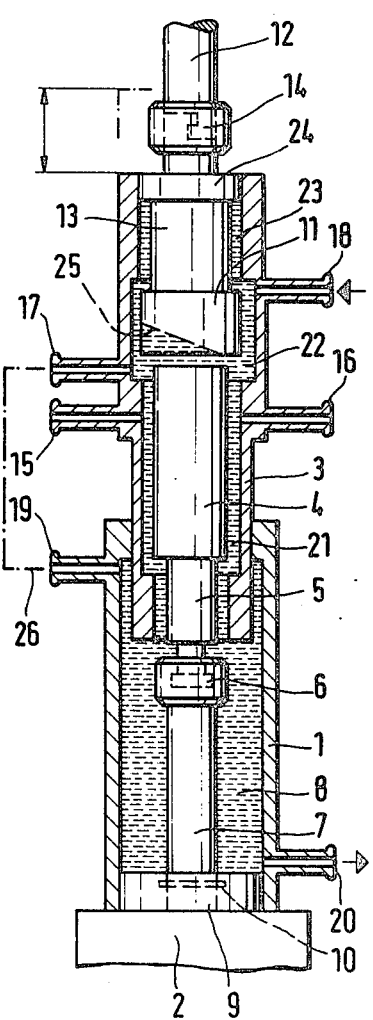
FIG. 2 shows the dispenser apparatus of FIG. 1 in the cleaning or sterilization position.

FIG. 1 shows, in particular, that the rotary valve 11 is guided within a cylindrical bore 21 of the dosing cylinder 3. This cylindrical bore 21 has an adjacent chamber portion 22 of enlarged diameter which, as FIG. 2 shows, provides accessibility ot the rotary valve 11 when the valve is moved from a first downward position to a second upward position. Above the chamber portion 22 there is a cylindrical bore 23, whose diameter corresponds to that of the cylindrical bore 21. The cylindrical bore 23 is provided with a seal 24, which is secured on the attachment 13 of the rotary valve 11.

The mode of operation of the dispenser apparatus will be made clear from the following description:

In FIG. 1, the dispenser apparatus is shown in a first working position, that is, in the induction phase for the fluid to be dosed and dispensed. This fluid is supplied via the inlet channel 15; during this supply period the dosing piston 4 is moved downward to create a volume in accordance with the quantity of fluid which is desired to be dosed. As indicated at reference numeral 25, the rotary valve during supply is in the position shown which opens the inlet channel 15 so that the fluid can enter into the chamber 21. Upon dosing piston 4 reaching the desired downward limit of travel, the rotary valve is turned 180° so that the outlet channel 16 is in communication with the chamber 21. Thereupon, the upward movement of the dosing piston 4 begins and the fluid contained in the cylinder is dispensed via the outlet channel 16 into a vessel, not shown, which is desired to be filled. During this dosing and filling process, a protective gas, such as sterile air, is provided both in the chamber 8 located below the dosing piston 4 and in the chamber 22 located above the rotary valve 11.

In FIG. 2, the cleansing or sterilization position of the dispenser apparatus according to the invention is shown. As shown, the dosing cylinder 3 has been moved downward within the cylinder 1, so that both the dosing piston 4 and the rotary valve 11 are rendered immersible to a cleansing fluid. The upper bore 23 is now closed off by the seal 24. At this time a cleansing or sterilizing medium can be supplied via the inlet channel 18, which is supplied via the channel 17 and a line 26, shown in broken lines, to the inlet channel 19 and thus to the chamber 8 and can exit again via the outlet channel 20. The inlet and outlet channels 15 and 16, respectively, for the dispenser product are made to remain closed during this cleaning or sterilization procedure in known manner.

In order to cleanse and sterilize the supply and delivery lines (not shown) attached to the inlet and outlet channels 15 and 16, a cleaning or sterilizing medium can be supplied to the inlet channel 15 and can be drawn off via the outlet channel 16. During this procedure, the cleansing fluid inlet and outlet channels 18 and 20 are closed. These two cleansing and sterilization phases may be performed in alternation.

As a result of the coaxial disposition of the dosing piston 4 and the rotary valve 11, on the one hand, and the displaceable disposition of the dosing cylinder 3, on the other hand, there is achieved, as clearly shown in FIG. 2, a very simple, effective, and certain manner for cleaning those parts which come into contact with the dispenser product. In addition, the apparatus following the preferred embodiment allows a very simple disassembly of the entire dispenser apparatus.

The foregoing description relates to a preferred embodiment of the invention; however, the apparatus comprehends that other embodiments and variants thereof are possible within the spirit and scope of the invention, which is defined by the appended claims.

What is claimed and desired to be secured by Letters Patent of the United States is:

1. A dispensing apparatus for dispensing a fluid medium in which parts of the apparatus used in dispensing the fluid may be cleaned and sterilized without removal of the parts and the parts are always sterile during dispensing doses which comprises:
   a fixed frame;
   a fixed cylinder secured at one end to said fixed frame and forming a first sterile chamber;
   an axially movable shaft in coaxial relationship with said fixed cylinder;
   a dispensing cylinder in axial alignment with said fixed cylinder and mounted with one end axially movable within said fixed cylinder;
   said dispensing cylinder including a dosage dispensing chamber and a second sterile chamber in axial alignment;
   said first and second sterile chambers being in axial alignment and on opposite sides of said dosage dispensing chamber;
   a dispensing piston in coaxial alignment with said dispensing cylinder and in axial alignment with said axially movable shaft for axial movement in said dispensing chamber and said first sterile chamber;
   means on said axially movable shaft for securing one end of said dispensing piston to said axially movable shaft;
   a first inlet in said dispensing cylinder;
   a first outlet in said dispensing cylinder in direct opposition to said first inlet;
   a rotary valve in said dispensing cylinder in coaxial relationship therewith in axial relationship with said dispensing piston and in radial alignment with said first inlet and said first outlet;
   means for rotating said rotary valve to close and open said first inlet and said first outlet;
   a second inlet and a second outlet connected with said second sterile chamber in said dispensing cylinder; a third inlet and a third outlet connected to said first sterile chamber in said fixed cylinder;
   whereby fluids may be dispensed with said dispensing cylinder in one position and said dispensing elements may be cleaned and sterilized when said dispensing cylinder is moved to a second position relative to said first sterile chamber in said fixed cylinder.

2. A dispensing apparatus as claimed in claim 1, which includes:
   a shaft for rotating said rotary valve; and
   a seal on said shaft for sealing complementary surfaces between said shaft and said dispensing cylinder, said seal being outwardly of said secured sterile chamber in said dispensing cylinder.

3. A dispensing apparatus as claimed in claim 2, wherein:
   said rotary valve includes an angular end surface;
   whereby said first inlet is open and said first outlet is closed when said rotary valve is in position for admitting a dosage into said dispensing chamber of said dispensing cylinder and vice versa when dispensing said dosage from said dispensing chamber.

4. A dispensing apparatus as claimed in claim 3, wherein:
   said dispensing piston and said rotary valve have axially aligned portions of different diameter to assist in cleaning and sterilizing said parts.

5. A dispensing apparatus as claimed in claim 4, which includes:
   means that connects said outlet of said second sterile chamber with the inlet of said first sterile chamber;
   whereby sterile gases, cleaning and sterilization medium may be fed from one sterile chamber to the other.

* * * * *